US012701125B2

(12) United States Patent
Sathya Moorthy et al.

(10) Patent No.: US 12,701,125 B2
(45) Date of Patent: Aug. 4, 2026

(54) DEEP LEARNING FOR IN-LINE DETECTION OF MALICIOUS COMMAND AND CONTROL TRAFFIC FROM UNSTRUCTURED PAYLOADS

(71) Applicant: Palo Alto Networks, Inc., Santa Clara, CA (US)

(72) Inventors: Chitra Priyaa Sathya Moorthy, Cupertino, CA (US); Lei Xu, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 69 days.

(21) Appl. No.: 18/649,280

(22) Filed: Apr. 29, 2024

(65) Prior Publication Data

US 2025/0337755 A1 Oct. 30, 2025

(51) Int. Cl.
H04L 9/40 (2022.01)
(52) U.S. Cl.
CPC ............................... H04L 63/1416 (2013.01)
(58) Field of Classification Search
CPC .................................................. H04L 63/1416
See application file for complete search history.

(56) References Cited

U.S. PATENT DOCUMENTS

| | | | | |
|---|---|---|---|---|
| 11,714,903 B1 * | 8/2023 | Jia | .......................... | G06F 21/566 726/24 |
| 11,843,624 B1 | 12/2023 | Estep | | |
| 2018/0288086 A1 * | 10/2018 | Amiri | ................. | H04L 63/1425 |
| 2018/0293381 A1 * | 10/2018 | Tseng | .................... | G06F 21/566 |
| 2021/0377295 A1 * | 12/2021 | Alfraih | .............. | H04L 63/1408 |
| 2023/0083949 A1 | 3/2023 | Mutolo | | |
| 2023/0231857 A1 | 7/2023 | Neupane | | |
| 2024/0037231 A1 | 2/2024 | Jia | | |
| 2024/0380761 A1 * | 11/2024 | Wang | ................. | H04L 63/1416 |
| 2025/0181832 A1 | 6/2025 | Jain | | |
| 2025/0202916 A1 | 6/2025 | Duan | | |

FOREIGN PATENT DOCUMENTS

| | | |
|---|---|---|
| CN | 117424740 | 1/2024 |

OTHER PUBLICATIONS

Keras, ByteTokenizer, Mar. 19, 2024.

* cited by examiner

*Primary Examiner* — Thomas J Dailey
(74) *Attorney, Agent, or Firm* — Van Pelt, Yi & James LLP

(57) ABSTRACT

Various techniques for providing deep learning for inline detection of malicious command and control (C2) traffic from unstructured payloads are disclosed. In some embodiments, a system/process/computer program product for providing deep learning for inline detection of malicious C2 traffic from unstructured payloads includes monitoring a session at a security platform, wherein the session includes network traffic; executing a local deep learning model on the network traffic, wherein the local deep learning model is a machine learning implemented C2 (MLC2) model executed on the security platform; and performing an action in response to determining that the monitored session is associated with malware based at least in part on a verdict from the deep learning model.

15 Claims, 9 Drawing Sheets

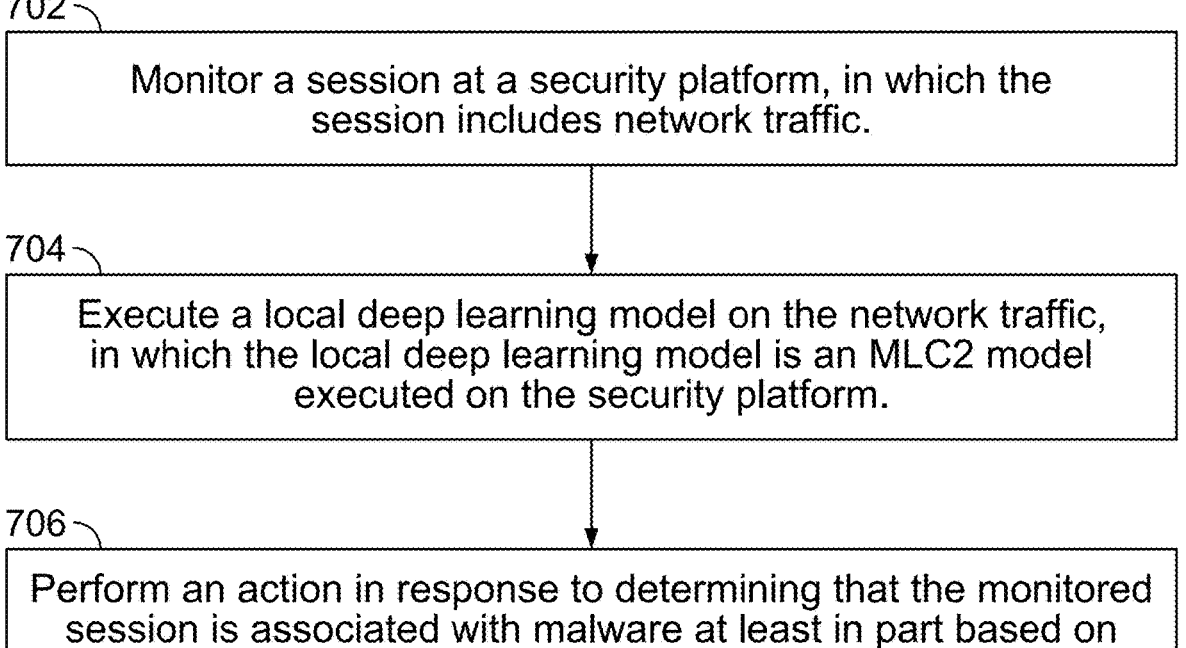

702 — Monitor a session at a security platform, in which the session includes network traffic.

704 — Execute a local deep learning model on the network traffic, in which the local deep learning model is an MLC2 model executed on the security platform.

706 — Perform an action in response to determining that the monitored session is associated with malware at least in part based on a verdict from the MLC2 model.

FIG. 7

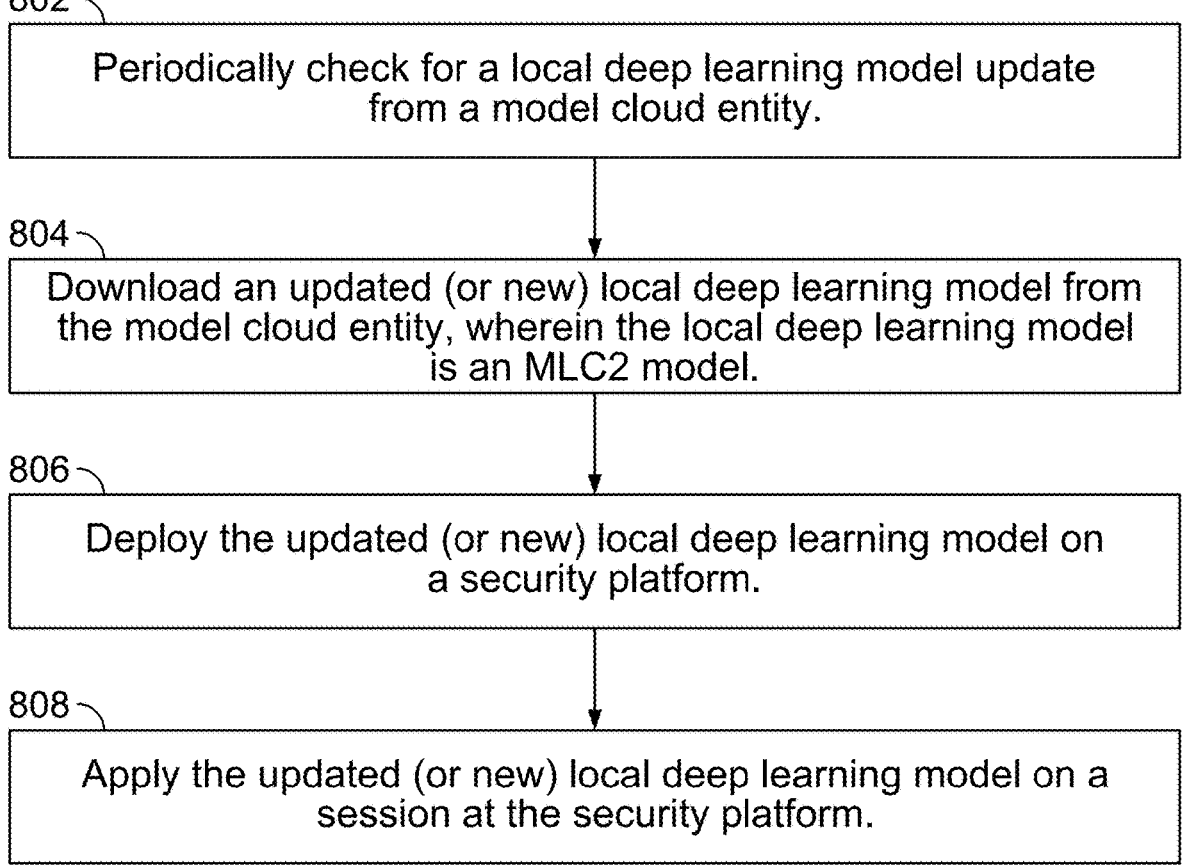

802 ┐

Periodically check for a local deep learning model update from a model cloud entity.

804 ┐

Download an updated (or new) local deep learning model from the model cloud entity, wherein the local deep learning model is an MLC2 model.

806 ┐

Deploy the updated (or new) local deep learning model on a security platform.

808 ┐

Apply the updated (or new) local deep learning model on a session at the security platform.

FIG. 8

DEEP LEARNING FOR IN-LINE DETECTION OF MALICIOUS COMMAND AND CONTROL TRAFFIC FROM UNSTRUCTURED PAYLOADS

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 7 is a flow diagram for providing deep learning for inline detection of malicious C2 traffic from unstructured payloads in accordance with some embodiments.

FIG. 8 is another flow diagram for providing deep learning for inline detection of malicious C2 traffic from unstructured payloads in accordance with some embodiments.

DETAILED DESCRIPTION

Figure 1:
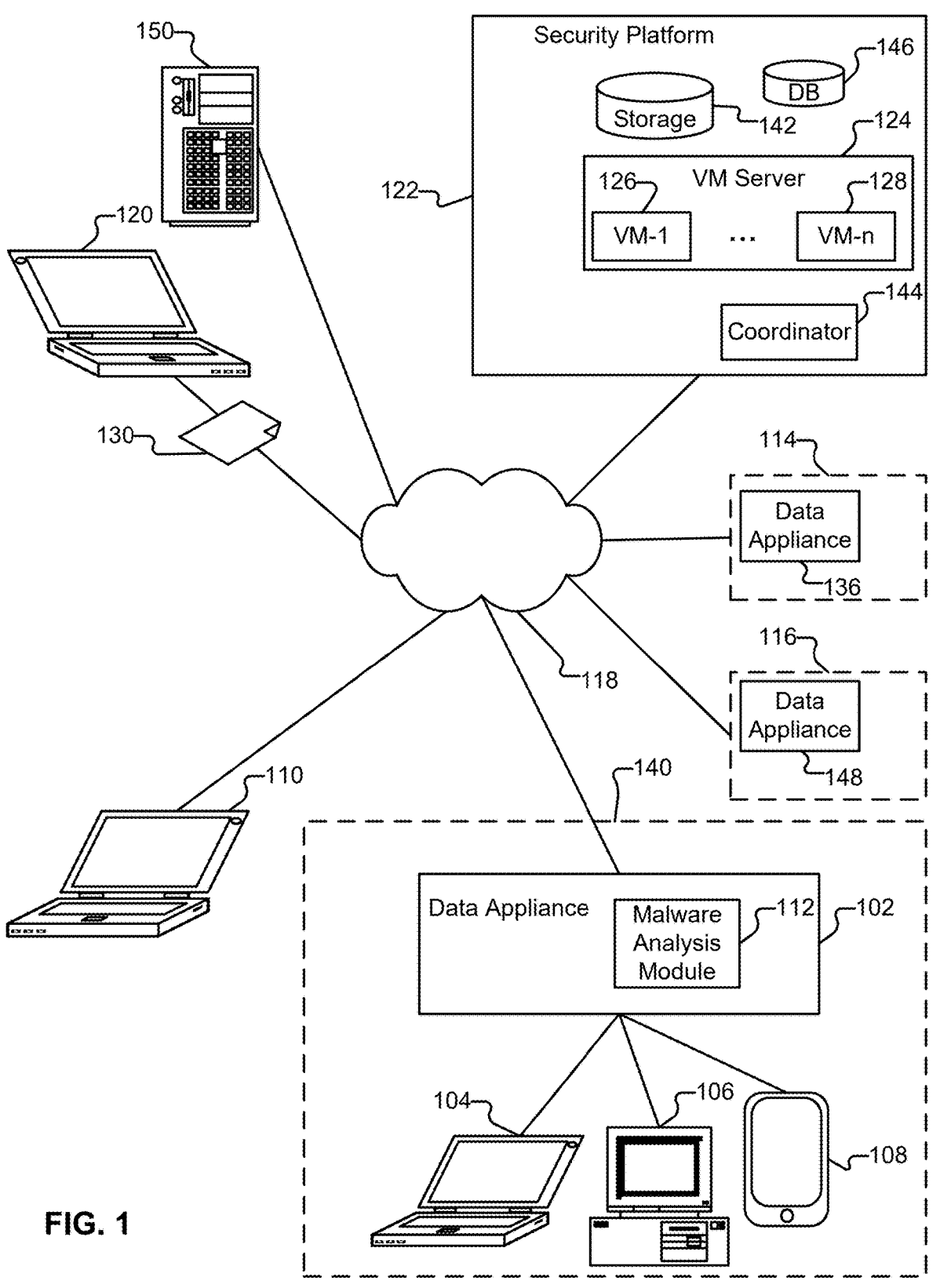
FIG. 1 illustrates an example of an environment in which malicious applications ("malware") are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Detection of Malicious Command and Control Traffic

Various protocols, such as UDP protocols, are widely used in malware command and control (C&C) for different purposes like beaconing, data exfiltration, DDoS attacks, etc.

Given that the UDP protocol is unstructured and with only a simple header, existing C&C detection systems typically focus on the payload information by using signatures or machine learning (ML) techniques based upon malicious patterns.

However, the existing pattern-based signatures or ML classifiers have some limitations.

First, the quality of malicious patterns is generally difficult to guarantee given that we cannot access all benign/malicious UDP payloads, not to mention often times, the payload is encoded/obfuscated.

Second, pattern-based signatures or ML models are heavily dependent on the dataset (e.g., training data) it was generated from, which is not generic from training to testing and can result in high false positives (FPs).

Third, for those malicious traffic without apparent patterns, the ML and signature solutions result in a high false negatives (FNs).

As such, new and improved solutions are needed for detection of command and control (C2) traffic.

Overview of Techniques for Deep Learning for Inline Detection of Malicious Command and Control (C2) Traffic from Unstructured Payloads Accordingly, various techniques providing for deep learning for inline detection of malicious command and control (C2) traffic from unstructured payloads (e.g., for UDP traffic) are disclosed.

However, existing approaches to UDP C&C detection/prevention suffer from several technical challenges.

One example is traffic anomaly/C&C detection with a large inspection window, which can generally require specialized/expensive hardware required to cope with speed and traffic volume as well as a large time to verdict (e.g., which can cause a detection to be too late to respond to such C2 attacks).

As another example, as similarly described above, existing signature/ML-based inline traffic anomaly/C&C detection approaches also suffer from several technical challenges.

First, the quality of malicious patterns is generally difficult to guarantee given that we cannot access all benign/malicious UDP payloads, not to mention often times, the payload is encoded/obfuscated. Further, new malicious signatures are generally required for new patterns (e.g., for new/evolving C2 traffic patterns).

Second, pattern-based signatures or ML models are heavily dependent on the dataset (e.g., training data) they were generated from, which is not generic from training to testing and can result in high false positives (FPs).

Third, for those malicious traffic without apparent patterns, the ML and signature solutions result in high false negatives (FNs).

Below are examples of difficult to capture patterns from C&C payloads.

```
nL\x9d\x8c@\xd1@\xca--\x08-
\x00\xe7\xca\xdaJ}\xce\xedxuT.~Y\\Y4\xa9H\nn.\x8d\x8c@\xd0@\xca>m;\x1f@\xa4\xcb\xd8\x
7f\xff\x8c\x91]\xd0A\x1b-1(\x0c\xe0\xe4\xfa\x98arBh
    *\x00\x11\x88\x94sU?w\xa6\x0f\xb6h@\xcdy\xaa\x02\x0eC\xc1\xe3\x81\xb4\x8
1s\xd1\x8aU*a\xe0\xfc\xf7\xb9
```

As such, a new and improved deep learning based approach to provide rapid, inline UDP C2 detection/prevention without manual feature/signature engineering efforts is provided, such as will now be further described with respect to various embodiments.

In some embodiments, a system/process/computer program product for deep learning for inline detection of malicious command and control (C2) traffic from unstructured payloads includes monitoring a session at a security platform, wherein the session includes network traffic; executing a local deep learning model on the network traffic, wherein the local deep learning model is a machine learning implemented C2 (MLC2) model executed on the security platform; and performing an action in response to determining that the monitored session is associated with malware based at least in part on a verdict from the deep learning model.

In some embodiments, a system/process/computer program product for deep learning for inline detection of malicious C2 traffic from unstructured payloads further includes automatically updating the local deep learning model using new training data.

In some embodiments, a system/process/computer program product for deep learning for inline detection of malicious C2 traffic from unstructured payloads further includes periodically deploying an updated version of the local deep learning model, wherein an updated version of the local deep learning model is automatically updated using new training data.

In some embodiments, a system/process/computer program product for deep learning for inline detection of malicious C2 traffic from unstructured payloads further includes inputting a byte stream associated with the network traffic into the local deep learning model; and performing tokenization processing of the byte stream provided as input into the local deep learning model, wherein one or more bytes are extracted from the byte stream and translated into one or more tokens.

In some embodiments, a system/process/computer program product for deep learning for inline detection of malicious C2 traffic from unstructured payloads further includes inputting a byte stream associated with the network traffic into the local deep learning model; performing tokenization processing of the byte stream provided as input into the local deep learning model, wherein one or more bytes are extracted from the byte stream and translated into one or more tokens; and generating a score using the local deep learning model that processes the one or more tokens.

In an example implementation, a deep learning-based classifier is used to detect malicious UDP C&C traffic in unstructured UDP payloads. Specifically, to label malicious/benign UDP sessions, we use signatures from IDPS; reputations of Source and Destination IP addresses, which are explicitly indicated in the first packets of each of the UDP packet headers; as well as cross-session indicators from other protocols, e.g., HTTP, SSL, etc.

Upon labeled data, we train a CNN model with byte-level and word-level tokenization/embedding [using Python byte tokenizer library available at https://keras.io/api/keras_nlp/ tokenizers/byte_tokenizer/], i.e., words for preserving malicious/benign contexts and bytes for generality. The CNN architecture is well designed to achieve both high accuracy in detections and low FPR as well as minor inference overhead, which allows the trained CNN model to be deployed as an inline service to detect/prevent malicious C&C traffic in real-time from the first few UDP packets.

For example, the disclosed techniques for deep learning for inline detection of malicious C2 traffic from unstructured payloads provide rapid and inline detection of malware encrypted traffic with comprehensive and hybrid ground-truth labeling for UDP sessions (e.g., low inference latency resulting in improved customer experiences; and low service cost with low latency and high resolution per second (RPS)).

Further, the disclosed deep learning for inline detection of malicious C2 traffic from unstructured payloads can handle unstructured UDP payloads with general word-based and byte-based tokenization/embedding.

Moreover, the disclosed deep learning for inline detection of malicious C2 traffic from unstructured payloads facilitates a low false positive rate (FPR) (e.g., an FPR below or equal to 0.025%), a low false negative rate (FNR), and inference latency with a well-designed CNN architecture. In an example implementation, the disclosed MLC2 deep learning model for network traffic (e.g., UDP traffic) from unstructured payloads renders sufficient TPR and FPR with at most 1000 bytes of a first 4 UDP packets of network traffic for analysis, such as further described below.

In addition, the disclosed deep learning for inline detection of malicious C2 traffic from unstructured payloads does not allow for malicious attack bypass (e.g., malicious content bypassing), given the detection is performed in the first few UDP packets.

Finally, the disclosed deep learning for inline detection of malicious C2 traffic from unstructured payloads can be generated automatically for model updates. For example, feature engineering is not required and the disclosed MLC2 model can be auto trained periodically.

The disclosed MLC2 model can be deployed for inline detection, such as executing on a data plane of a security platform, to detect/prevent malicious C&C traffic in real-time from the first few UDP packets. Similarly, the disclosed MLC2 model can be deployed as an inline service (e.g., a local deep learning model applied to inline traffic) to detect/prevent malicious C&C traffic in real-time from the first few UDP packets.

These and other embodiments for deep learning for inline detection of malicious C2 traffic from unstructured payloads (e.g., for UDP traffic) will be further described below.

Example System Embodiments for Deep Learning
in a Data Plane

Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) which, for example, can be provided in part or in whole as a SASE security solution, in which the cloud-based security solution (e.g., SASE) can be monitored using the disclosed techniques for an application access analyzer, as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware (e.g., including previously unknown/new variants of malware, such as C2 malware).

"Malware" as used herein refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop/mobile application that encrypts a user's stored data (e.g., ransomware). Another example of malware is C2 malware, such as similarly described above. Other forms of malware (e.g., keyloggers) can also be detected/thwarted using the disclosed techniques for sample traffic based self-learning malware detection as will be further described herein.

Techniques described herein can be used in conjunction with a variety of platforms (e.g., servers, computing appliances, virtual/container environments, desktops, mobile devices, gaming platforms, embedded systems, etc.) and/or for automated detection of a variety of forms of malware (e.g., new and/or variants of malware, such as C2 malware, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
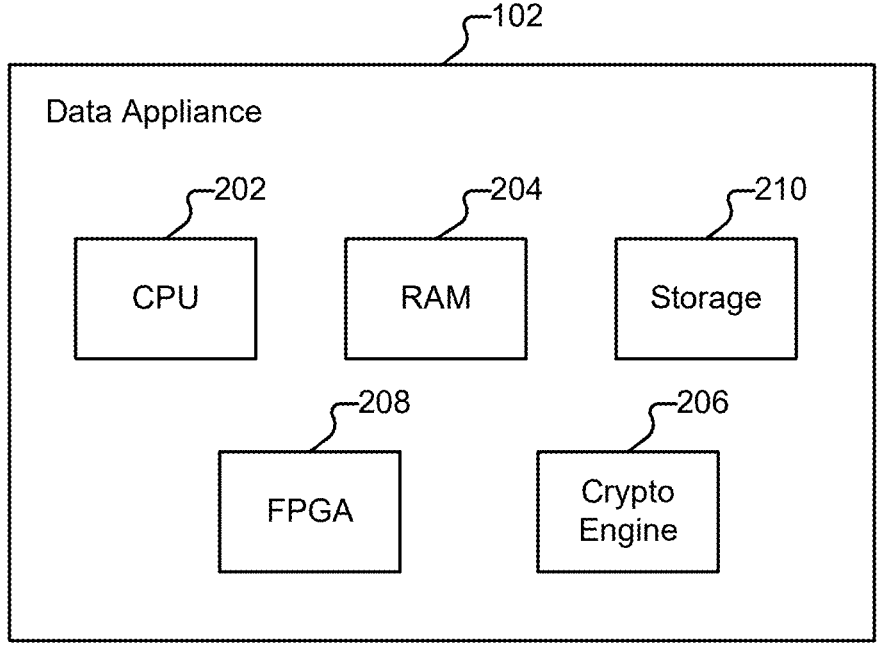
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning (ML) models (e.g., such as for sample traffic based self-learning malware detection). Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
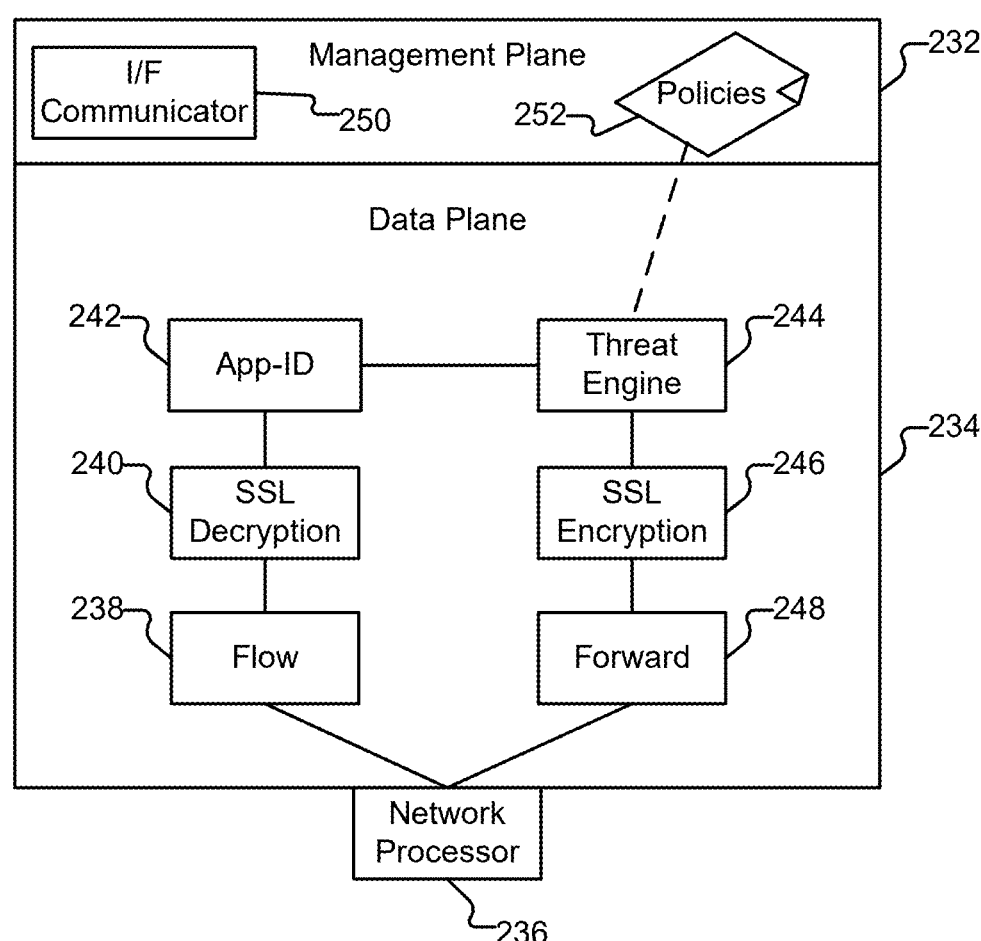
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Distinct types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include C2 malware detection policies using the disclosed techniques for sample traffic based self-learning malware detection. An interface (I/F) communicator 250 is provided for management communications (e.g., via (REST) APIs, messages, or network protocol communications or other communication mechanisms).

Security Platform

Returning to FIG. 1, suppose a malicious individual (using system 120) has created malware 130, such as malware for a malicious web campaign (e.g., the malware can be delivered to endpoint devices of users via a compromised website when the user visits/browses to the compromised website or via a phishing attack, etc.). The malicious individual hopes that a client device, such as client device 104, will execute a copy of malware 130 to unpack the malware executable/payload, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C2/C&C) server 150, as well as to receive instructions from C2 server 150, as applicable.

Suppose data appliance 102 has intercepted an email sent (e.g., by system 120) to a user, "Alice," who operates client device 104. In this example, Alice receives the email and clicks on the link to a phishing/compromised site that could result in an attempted download of malware 130 by Alice's client device 104. However, in this example, data appliance 102 can perform the disclosed techniques for sample traffic based self-learning malware detection and block access from Alice's client device 104 to the packed malware content and to thereby preempt and prevent any such download of malware 130 to Alice's client device 104. As will be further described below, data appliance 102 performs the disclosed techniques for sample traffic based self-learning malware detection, such as further described below, to detect and block such malware 130 from harming Alice's client device 104.

As shown, data appliance 102 includes a malware analysis module 112. In an example implementation, malware analysis module executes a deep learning (DL) model(s) inline for malware detection (e.g., an inline deep learning model for ATP detection, C2 detection, and/or various other DL models can be similarly deployed and executed inline on a data plane of a security platform/firewall/NGFW, such as advanced URL, DNS, DLP, and/or other DL models, such as similarly described above and further described below). In this example implementation, the malware analysis module implements the disclosed deep learning in a data plane (e.g., of a security platform, such as a firewall/NGFW) as similarly described above and further described below with respect to various embodiments.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C2 server 150 (e.g., where C&C server 150 is known to be malicious). The list of malicious domains (and/or IP addresses) can also help data appliance 102 determine when one of its nodes has been compromised. For example, if client device 104 attempts to contact C2 server 150, such attempt is a strong indicator that client 104 has been compromised by malware (and remedial actions should be taken accordingly, such as quarantining client device 104 from communicating with other nodes within enterprise network 140).

As will be described in more detail below, security platform 122 can also receive a copy of malware 130 from data appliance 102 to perform cloud-based security analysis for performing sample traffic based self-learning malware detection, and the malware verdict can be sent back to data appliance 102 for enforcing the security policy to thereby safeguard Alice's client device 104 from execution of malware 130 (e.g., to block malware 130 from access on client device 104).

A variety of actions can be taken by data appliance 102 if no signature for an attachment is found, in various embodiments. As a first example, data appliance 102 can fail-safe, by blocking transmission of any attachments not allow-listed as benign (e.g., not matching signatures of known good files). A drawback of this approach is that there may be many legitimate attachments unnecessarily blocked as potential malware when they are in fact benign. As a second example, data appliance 102 can fail-danger by allowing transmission of any attachments not block-listed as malicious (e.g., not matching signatures of known bad files). A drawback of this approach is that newly created malware (previously unseen by security platform 122) will not be prevented from causing harm. As a third example, data appliance 102 can be configured to provide the file (e.g., malware 130) to security platform 122 for static/dynamic analysis, to determine whether it is malicious and/or to otherwise classify it.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware files, including for network traffic based heuristic IPS malware detection, etc. (e.g., daily, hourly, or some other interval, and/or based on an event configured by one or more policies). The subscription can cover the analysis of just those files intercepted by data appliance 102 and sent to security platform 122 by data appliance 102, and can also cover signatures of malware known to security platform 122.

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
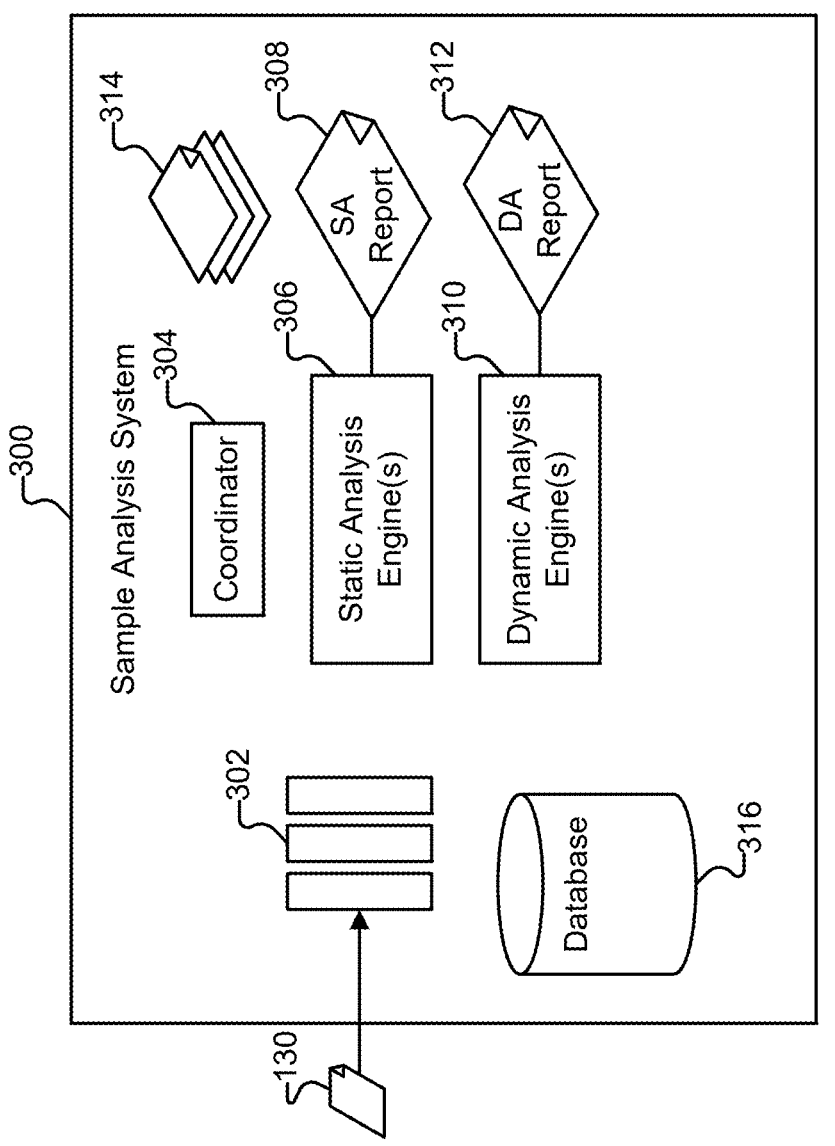
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (e.g., collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C2/C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of malware can include performing a signature-based analysis. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance (e.g., emulation/sandbox analysis of samples for malware detection, such as the above-described C2 malware detection based on monitored network traffic activity). In some embodiments, results of static analysis (e.g., performed by static analysis engine 306), whether in report (308) and/or as stored in database 316, or otherwise stored, are provided as input to dynamic analysis engine

310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

The disclosed techniques for deep learning in a data plane will now be further described below with respect to various system embodiments.

Deep Learning for Inline Detection of Malicious C2 Traffic from Unstructured Payloads As used herein, a large language model (LLM) generally refers to a type of artificial intelligence (AI) algorithm implemented model that uses deep learning techniques and massively large data sets to understand, summarize, generate, and predict new content.

As used herein, Advanced Threat Prevention (ATP) generally refers to a set of inline advanced threat protection features, such as, for example, ML-based Exploit detection, Machine Learning (ML-based) Command and Control detection (MLC2), Advanced DNS, etc.

As used herein, MLC2 generally refers to an ATP feature that provides inline analysis of Command and Control (C2) traffic (e.g., which can include cloud-based analysis or can be performed locally using a security platform/NGFW executing deep learning in a data plane using the disclosed techniques).

As used herein, Local Deep Learning (LDL) generally refers to locally executing deep learning models to analyze and detect data for malicious content to pre-filter inline cloud analysis.

As used herein, Wildfire Inline Forwarding (WIF) generally refers to an interface on an OS executed on a security platform (e.g., PANOS executed on a Network Gateway Firewall (NGFW)) to forward messages for inline cloud analysis.

As used herein, Software Database (SDB) generally refers to the configuration settings for a database.

As used herein, MICA generally refers to Multi-purpose Inline Cloud Analysis.

As used herein, PANDB cloud refers to a URL categorization solution that implements a MICA flag to focus on malicious content for the inline cloud analysis.

As used herein, ONNX Runtime generally refers to a cross-platform machine-learning model accelerator, with a flexible interface to integrate hardware-specific libraries. For example, the ONNX Runtime can be used with models from PyTorch, Tensorflow/Keras, TFLite, scikit-learn, and/or other AI/ML frameworks.

Figure 4:
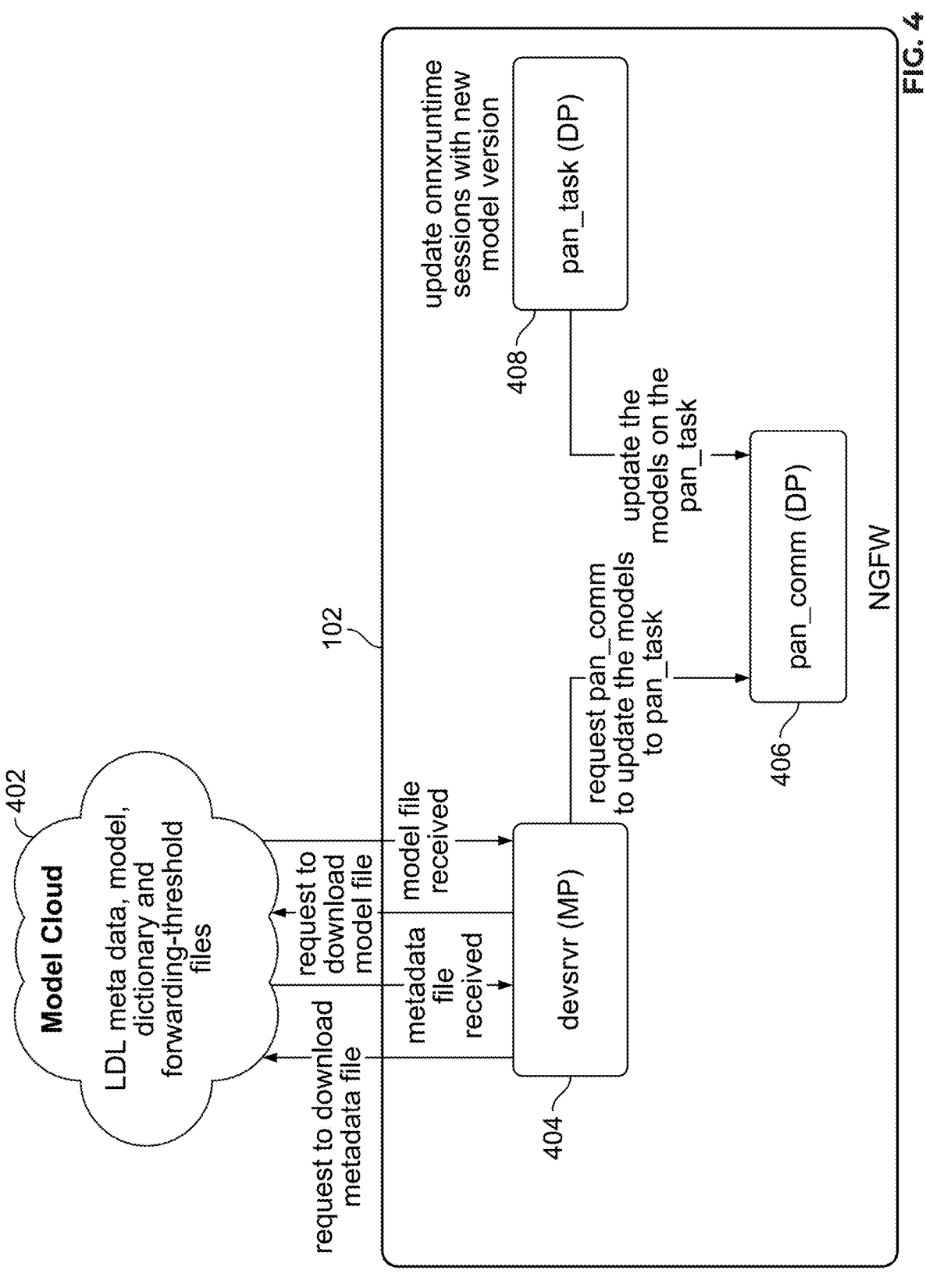
FIG. 4 illustrates a training and deployment architecture for providing deep learning for inline detection of malicious command and control (C2) traffic from unstructured payloads in accordance with some embodiments.

FIG. 4 illustrates a training and deployment architecture for providing deep learning for inline detection of malicious command and control (C2) traffic from unstructured payloads in accordance with some embodiments. Generally, FIG. 4 illustrates an example of a deployment architecture for implementing deep learning inference directly in a data plane of a data appliance 102 (e.g., a data appliance, such as an NGFW or other security platform as similarly described above with respect to FIG. 1).

Referring to FIG. 4, a model file (e.g., ML/deep learning model file) is downloaded from a model cloud 402 to data appliance/security platform 102. The model file is initially received at a management plane (MP) 404 of the security platform. The model is then loaded into a data plane (DP) 406 (e.g., PanOS data plane) of the security platform (e.g., into a DP memory). As shown at 408, runtime sessions are updated with the new model version. During data plane packet processing, the in-memory model is used to execute model inference on relevant network traffic payloads (e.g., with tokenization in some cases) to perform classification and/or detect threats (e.g., ATP or other types of malware/threats). In this example implementation, inputs to data plane processing using the in-memory model include a session pointer, a payload of a network packet, and a payload length, and an output includes a score for malicious or benign. For example, if the model score is greater than a forwarding-threshold value (e.g., 0.99 or another threshold value can be used), then the content is deemed malicious (e.g., is most likely malicious), otherwise it is deemed benign. If a malicious payload is detected, then the security platform can be configured to drop the packet(s) and optionally reset the connection.

In this example implementation, the model file is sized to fit into the data plane memory (e.g., the model file is not too large to be stored in the data plane memory). Specifically, the model file (e.g., the model file can be generated in an ONNX format in the model training and generation pipeline performed at the cloud security service, such as shown as a security platform/cloud service at 122 in FIG. 1) can be integrated into a library (e.g., an ONNX Runtime C library into the data plane C code for an ML model for prefiltering for Command and Control (C2) related malware detection (MLC2 model) in this example implementation; and in other example implementations, a Field Programmable Gate Array (FPGA)-based model for MLC2 can similarly be provided), and the library application programming interface(s) (API(s)) can then be called to load the model and perform the inference executed in the data plane memory as similarly described above.

Moreover, the inference is fast enough to not stall overall data plane packet processing. For example, with an example model (e.g., MLC2 HTTP model and/or other types of ML/deep learning models, such as ATP models, etc.), inference can be executed in the data plane memory in about 1 millisecond (ms) on various CPUs (e.g., Thunderbolt (PA-54xx), BlackBird (PA-7500), selected virtual/VM-based firewalls on x86 CPUs and/or ARM CPUs, etc.) and data plane memory usage is approximately 8 megabytes (MB).

In another example implementation, advanced threat protection (ATP) services on a security platform (e.g., a data appliance, such as a next generation firewall (NGFW)) provide inline analysis of the data (e.g., network traffic associated data) being passed through the security platform (e.g., inline firewall) to prevent the malware and advanced threats to stop cyber-attacks (e.g., zero day threats). Specifically, in this example implementation, the ATP services can be provided by downloaded ATP models (e.g., ML/deep learning models trained for detecting ATP related activities) that are deployed to the data plane memory and executed inline on monitored network traffic using the trained ATP models (e.g., and/or other types of ml/deep learning models for cyber security).

In an example implementation for providing the local deep learning (LDL) model download and update to the data appliance/security platform (102), the model files, such as new versions of MLC2 LDL model files, are periodically checked (e.g., every 5 minutes or some other configurable period) and downloaded to the security platform (e.g., data appliance/NGFW) from the model cloud (402) (e.g., MLC2 LDL and/or other LDL models are downloaded if there is a new version available to download and if the security platform supports such LDL models and software/subscription licenses for such LDL models are valid for that security platform/security service subscriber). The model files can be downloaded from the model cloud to the security platform over a secure network connection (e.g., through an SSL (port: 443) connection using a curl request). There is no disruption of the security services during the LDL model download and update processing.

Model files can be validated by checking the maximum file size limits and a hash (e.g., sha256 hash or other hash) value. In this example implementation, a content decoder stores a list of supported LDL (e.g., MLC2 LDL, etc.) models. The operating system (OS) (e.g., PANOS or another OS) executed on the security platform can perform the validity check of models published on the model cloud by comparing them with the content decoder list.

As a specific example, the LDL model files can also include a metadata file, which is a listing of all the LDL model (e.g., LDL MLC2 model) files and includes the following information: a file type_id (e.g., 128 bytes); a model link (e.g., a download link to the model files); a Word dictionary file; a Character dictionary file; a Threshold file containing forwarding-threshold value (e.g., the file has 0.99 threshold value in it); and a Checksum file containing a hash (e.g., sha256 hash) value. The Word and Character dictionary files, which are downloaded from the model cloud, can be used to encode HTTP header data into digital codes before running the LDL model. These LDL model files can also include LDL Threshold and Checksum files. The LDL Threshold file is further described below. The Checksum file contains a hash (e.g., sha256 hash) value of the original model files, and this can be validated with the hash value of the downloaded file.

The downloaded LDL model files can be decompressed and stored on the security platform (e.g., the NGFW file system) and the model files can be updated with the new/updated model files. For example, an MLC2 LDL model file is read from the file system and loaded into an ONNX Runtime session. ONNX Runtime sessions are created in NGFW shared memory so that all DP's can access it from one location (e.g., ONNX Runtime is an open source library that can execute LDL models, such as the MLC2 LDL software models, and can be integrated into the security platform OS, such as the PANOS for an NGFW, as an RPM Package Manager (RPM) package, which is a free and open source package management system).

A custom shared memory allocator API can be used for the ONNX runtime library, which does not provide an API for a shared memory allocator. Alternatively, an ONNX Runtime session can be created on each DP for the same LDL model (e.g., given that such LDL models are generally less than 10 MB, such is feasible on high-end security platforms).

As discussed above, the LDL threshold file can include a threshold value (e.g., 0.99 or some other threshold value) for the malicious score. If this score is met or exceeded during execution of the LDL model on a given packet(s) (e.g., payloads associated with the monitored network packet(s)), then the LDL model can generate a malicious determination. An action can be performed based on a policy (e.g., security policy) configured for a malicious determination by the LDL model (e.g., block, drop, alert, log, quarantine the endpoint, send to the security platform/cloud service (122) for further analysis, etc.).

In this example implementation, the disclosed deep learning for inline detection of malicious C2 traffic from unstructured payloads can be generated automatically for model updates. For example, feature engineering is not required and the disclosed MLC2 model can be auto trained periodically.

These and other aspects for the disclosed techniques for providing deep learning in a data plane of a security platform (e.g., NGFW) will now be further described below with respect to various embodiments.

For example, the disclosed techniques for providing deep learning/ML model related capabilities to a data plane of a security platform facilitate validating the traffic on the NGFW data plane using trained deep learning models that will select the traffic which is likely to be highly malicious.

As another example, the disclosed techniques for providing deep learning/ML model related capabilities to a data plane of a security platform facilitate reducing the traffic forwarded to the ATP cloud, hence latency and bandwidth limitations are highly reduced.

As yet another example, the disclosed techniques for providing deep learning/ML model related capabilities to a data plane of a security platform facilitate deep learning models being applied to the large volume of suspicious traffic on the data plane by broadening the scope of the suspicious websites.

As such, the disclosed techniques for providing deep learning/ML model related capabilities to a data plane of a security platform (e.g., PanOS data plane) to perform inline traffic processing improve existing threat detections.

Example LDL Model Training and Optimization for Data Plane Execution

As similarly discussed above, the deep learning models can be optimized for data plane deployment and execution. In an example implementation, the deep learning models (e.g., an implementation of the MLC2 HTTP LDL model includes approximately 17 million weights) are generated to utilize a smaller footprint, such as via quantization and/or neural network trimming, as will also be further described below. This results in shorter CPU compute time for the inference and smaller memory footprint. In addition, such improvements to these deep learning (DL) models facilitate deploying and executing these DL models on, for example, embedded systems (e.g., PanOS firewalls/NGFWs).

In this example implementation, the LDL model can be trained using a fixed size input (e.g., using HTTP request headers with tokenization and encoding as further described herein). Example DL algorithms include convolutional neural networks (CNN) and recurrent neural networks (RNN) (e.g., long-short term memory (LSTM)).

The LDL model can be optimized to utilize less memory and to execute faster to facilitate data plane execution on a security platform/NGFW. For example, the LTSM layer can be removed without impacting the model performance (e.g., yielding similar true positive rates and false positive rates). For example, a CNN model can be generated that is about 20% smaller in size than the LTSM+CNN model (e.g., about 78,096,334 bytes as compared to about 97,186,526 for the MLC2 model based on experiments). Moreover, the CNN model inference time is about four times faster than the LTSM+CNN model (e.g., as tested on eight core CPUs).

Further, quantization can be performed on the deep learning model (e.g., a CNN model or another deep learning model). For example, the MLC2 model can have post-training quantization performed to generate the ONNX format of the model (e.g., and it performs approximately three times faster than the base model, as tested on eight core CPUs).

In addition, the deep learning models can be further optimized using neural network trimming (e.g., using an Intel neural network compressor to perform pruning).

Figure 5:
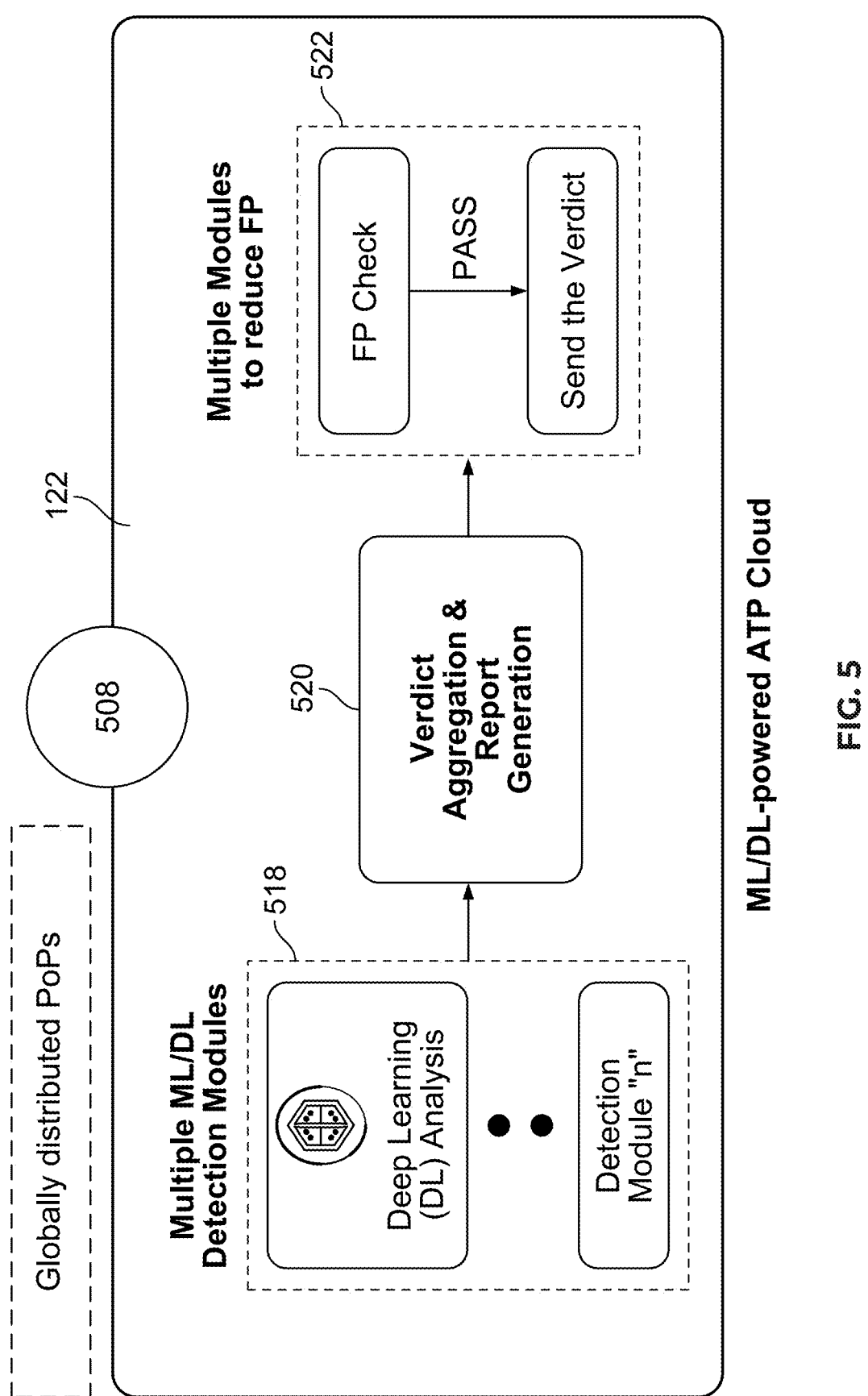
FIG. 5 illustrates a system architecture for providing deep learning for inline detection of malicious C2 traffic from unstructured payloads in accordance with some embodiments.

Example System Architecture for Deep Learning for Inline Detection of Malicious C2 Traffic from Unstructured Payloads FIG. 5 illustrates a system architecture for providing deep learning for inline detection of malicious C2 traffic from unstructured payloads in accordance with some embodiments. Generally, FIG. 5 illustrates an example of a system architecture for implementing deep learning inference directly in a data plane of a security platform 102 (e.g., a data appliance, such as an NGFW as similarly described above with respect to FIG. 1).

As discussed above, recent advancements now facilitate deep learning in a data plane on security platforms (e.g., LDL models deployed and executed on NGFW/firewall devices as described above with respect to FIG. 4, in part also due to new CPUs that are commercially available from Intel, such as Ice Lake and above, and AMD, such as Rome and Milan and above, that have sufficient memory, such as above 16 GB of memory, and have faster processing performance along with support for new instruction sets to accelerate neural network processing implemented by such LDL models).

Moreover, optimization of the various LDL models described herein that have a smaller memory footprint and can execute faster also facilitates deep learning in a data plane on security platforms. For example, these optimized LDL models can scan significantly more HTTP traffic, resulting in improved zero-day attack prevention on supported security platforms (e.g., supported NGFWs/FWs). In addition, it accelerates benign traffic verdicts.

As will now be further described below, the disclosed deep learning in a data plane of security platforms can be implemented to work in conjunction with the existing security cloud (122) (e.g., shown as ML/DL-powered ATP cloud 122 in FIG. 5, which can utilize various ML/DL detection models, such as for HTTP or other protocol traffic that can be deployed as LDL models on the data appliance/security platform (102)).

In an example implementation, once the LDL model(s) is downloaded to the security platform/NGFW 102 (e.g., also referred to simply as the firewall), such as described above with respect to FIG. 4, the following operations can then be performed on, for example, a PA-75xx, VM-Series (e.g., for VM implemented firewalls executing on supported CPUs that have AI optimizations/support, for example, an Intel processor Vector Neural Network Instructions (VNNI) can be enabled on the ESXi to boost the running of the models on PA-VM series), PA-5440 or PA-5445 data appliance commercially available from Palo Alto Networks, Inc., headquartered in Santa Clara, CA. The network traffic flows through the firewall. A signature match is attempted using signatures stored on the security platform/NGFW. If no signature is matched, then the traffic is processed by the local deep learning (DL) analysis in a data plane of the firewall (e.g., applying MLC2 pre-filtering using pre-filters, which can be implemented as similarly described in U.S. Pat. No. 11,770,361, which is hereby incorporated by reference in its entirety, and suspicious traffic can be sent to the MLC2 LDL model for DL analysis). The on-device/local deep learning (LDL) model (e.g., MLC2 LDL model) provides a suspicious or benign verdict (e.g., based on a score relative to the threshold value associated with the MLC2 LDL model, which in this example implementation is returned in about 200 millisecond (ms) or less).

Specifically, in this example implementation, LDL prefiltering for MLC2 can be done for HTTP request headers present in a single packet and/or cross-packet scenarios can also be implemented for performing MLC2 LDL prefiltering analysis on suspicious HTTP headers (e.g., HTTP request headers). During the MLC2 prefiltering analysis stage, an ONNX Runtime API is called, which consumes the encoded packet data, to execute the LDL model and to generate the above-referenced score value. If the score is greater than the threshold (e.g., a forwarding-threshold value, such as 0.99 or another value), the data (e.g., session traffic, including, for example, HTTP headers and/or associated payload content) is categorized as malicious. If the LDL prefiltering score is greater than the threshold then the data is malicious, and it is sent to the cloud analysis for a false positive check as will be further described below. In some cases, the inline-cloud analysis can be bypassed if the score is less than (or equal to) the threshold (e.g., a forwarding threshold), which means the data (e.g., session traffic) is benign.

Referring now to FIG. 5, if the score is below the threshold, then a benign verdict is returned. If the score meets or exceeds the threshold, then the network traffic (e.g., a subset of the session traffic in the form of, in this example implementation, raw traffic payload, along with some associated session information) is sent to the security cloud 122 for further analysis as shown at 508. Specifically, the ML/DL-powered ATP cloud (122) performs further analysis using one or more DL models (e.g., detection modules) as shown at 518 to perform an allow list and a block list check to avoid false positives (FPs) (e.g., for a target FP rate of 0.025% or less) and false negatives (FNs) using multiple models to reduce FPs as shown at 522. The verdict and the ATP report can then be generated as shown at 520 and returned to the firewall based on the verification results of the FP check as described above. Alternatively, a FP check can be performed local at the firewall (e.g., based on FP validity check information downloaded from the ATP cloud (122) to the firewall (102)). The firewall can be configured to perform a responsive action in the event of a malware/threat detection based on a security policy, such as the following actions: allow, alert, drop/block, reset the client-side connection, reset the server-side connection, reset the connection on both the client and server ends, and/or other actions (e.g., log the session, quarantine the endpoint, add the server-side IP address associated with the malicious connection to a block list, etc.).

Figure 6:
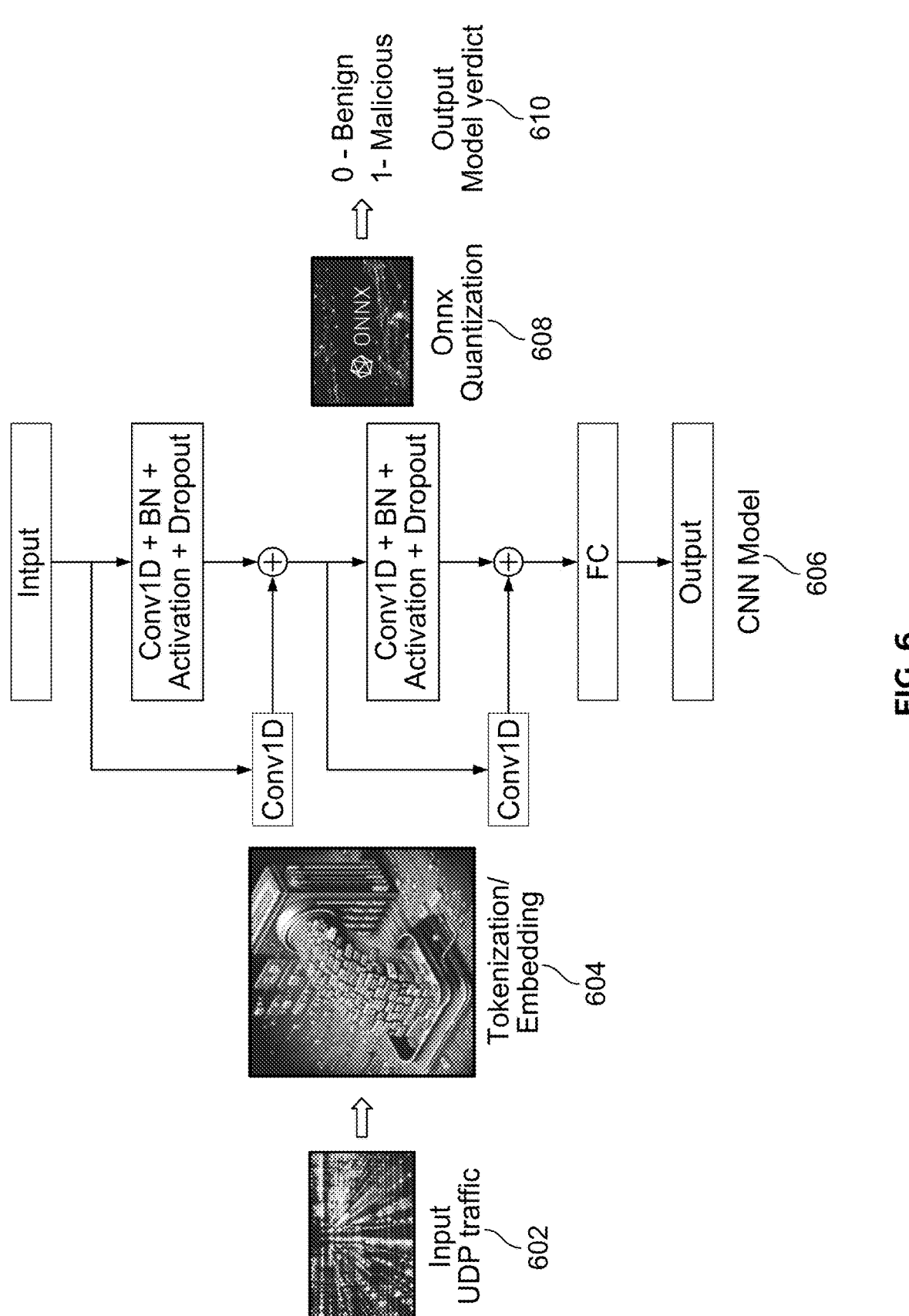
FIG. 6 is an overview of a training and MLC2 model generation process flow diagram for providing deep learning for inline detection of malicious C2 traffic from unstructured payloads in accordance with some embodiments.

FIG. 6 is an overview of a training and MLC2 model generation process flow diagram for providing deep learning for inline detection of malicious C2 traffic from unstructured payloads in accordance with some embodiments. The generated MLC2 model can be deployed as similarly described above with respect to FIG. 4, and the generated MLC2 model can be executed as similarly described above with respect to FIG. 5.

Referring to FIG. 6, at 602, training data is input for training a new (e.g., or for updating an existing) MLC2 model. For example, UDP traffic can be input into the model as shown in FIG. 6. As also similarly described above, the disclosed techniques facilitate automated updating of the MLC2 model using new/updated training data as manual feature engineering is not required.

In an example implementation, the training data is labeled as malicious or benign UDP sessions to provide for ground truths in the training processing. To label malicious/benign UDP sessions, signatures can be used from intrusion detection prevention systems (IDPS) and reputations of Source and Destination IP addresses can also be used, which are explicitly indicated in the first packets of each of the UDP packet headers (e.g., as well as cross-session indicators from other protocols, such as for HTTP, SSL, etc.).

At 604, tokenization and embedding are performed, such as will be further described below.

In this example implementation, byte-level tokenization and embedding (e.g., and/or word-level tokenization and embedding) are performed, which helps with random/unclear payload information (e.g., for unstructured UDP payloads to be used for malicious C2 automated detection).

Below is an example of such a byte-level tokenization and embedding.

'xca>m;\xlf@'->[120, 99, 97, 62, 109, 59, 31, 64]

At 606, the MLC2 model is generated. In this example implementation, the MLC2 model is generated as a convolutional neural network (CNN) implemented model (e.g., using a CNN-based ResNet architecture designed to process ordered series unknown-UDP data), such as further described below. The generated model effectively captures local neighborhood features, and the CNN model results in a low FP rate (FPR) and a high true positive (TP) rate (TPR).

At 608, the generated MLC2 model is quantized using ONNX quantization, such as further described below.

In this example implementation, quantization can be performed on the deep learning model (e.g., a CNN model or another deep learning model). For example, the MLC2 model can have post-training quantization performed to generate the ONNX format of the model (e.g., and it performs approximately three times faster than the base model, as tested on eight core CPUs).

In addition, the deep learning models can be further optimized using neural network trimming (e.g., using an Intel neural network compressor to perform pruning).

As such, these techniques can be applied to facilitate the generation of a well-designed, light weight CNN deep learning architecture for the MLC2 model.

At 610, the deployed MLC2 model can process traffic using rapid inline detection executed in a data plane of a security platform to output a model verdict, such as similarly described above with respect to FIG. 5. For example, an input of only about 1000 bytes, such as from a first four UDP packets, can be processed to perform a malicious C2 detection using the MLC2 model.

In an example implementation, the disclosed MLC2 deep learning model for network traffic (e.g., UDP traffic) from unstructured payloads renders sufficient TPR and FPR with at most 1000 bytes of a first 4 UDP packets of network traffic for analysis, such as further described below.

In an experiment based on training using two weeks of ATP customer data, training data with one week of validation results is used based on the ATP customers. Below is an example ATP data collection query.

```
mal_query = """SELECT data_sha256 FROM 'ace-ml-
prod.avs_dataset.avs_enriched_data' AS AVS_data \
    WHERE DATE(detection_timestamp) >= "2023-01-14" AND
    AVS_data.protocol = "unknown-udp" AND
    (AVS_data.avs_ground_truth = 'TP' OR
    AVS_data.avs_ground_truth = 'FN')"""
ben_query = """SELECT data_sha256 FROM 'ace-ml-
prod.avs_dataset.avs_enriched_data' AS AVS_data
    WHERE DATE(detection_timestamp) >= "2023-01-14" AND
    AVS_data.protocol = "unknown-udp" AND
    (AVS_data.avs_ground_truth = 'TN' OR
    AVS_data.avs_ground_truth = 'FP')"""
```

In this experiment, the trained and generated MLC2 model resulted in a TPR of 99.99% and a FPR of 0.0008%. The average inference time was 6.74 milliseconds (ms) (e.g., as compared with an approximately 100 ms firewall to cloud roundtrip time (RTT)).

Further fine tuning can also be performed on the generated MLC2 model as will now be described below.

Given that the collected training data (e.g., collected ATP data as described above) is often not balanced data and to avoid the class imbalance problem, a function can be applied to calculate and capture the highest F1 score among the data using the best threshold that can be found. In this experiment, applying the function helped with a 7% increase in precision and a 0.67% decrease in false positive rate. As such, this coding process can be automated to compute the best operating point for future models.

In addition, parameter tuning can also be performed to enhance the MLC2 model, including, for example, benign and malicious class weights, embedding size, kernel size, convolutional filter, batch size, and epochs.

Also, various data enrichment can be performed to enhance the MLC2 model. For example, deduplicating benign training data can be performed (e.g., based on IP and port (v4_destination_ip, destination_port, v4_source_ip, source_port), pattern based). As another example, upsampling malicious can be performed (e.g., more weightage for malicious data).

As will now be apparent to one of ordinary skill in the art in view of the disclosed embodiments, the disclosed techniques for providing deep learning for inline detection of malicious C2 traffic from unstructured payloads can be implemented using various training data and various ML techniques, such as CNN-based models and/or various other ML techniques can be similarly used to generate the disclosed MLC2 model for inline detection of malicious C2 traffic.

Various process embodiments for providing deep learning for inline detection of malicious C2 traffic from unstructured payloads will now be further described below.

Example Process Embodiments for Deep Learning for Inline Detection of Malicious C2 Traffic from Unstructured Payloads FIG. 7 is a flow diagram for providing deep learning for inline detection of malicious C2 traffic from unstructured payloads in accordance with some embodiments. In some embodiments, a process as shown in FIG. 7 is performed by a security platform (e.g., a data appliance 102 using a malware analysis system 112, such as an inline deep learning model and/or other components), and techniques as similarly described above including the embodiments described above with respect to FIGS. 1-6.

At 702, monitoring a session is performed at a security platform, wherein the session includes network traffic, such as similarly described above with respect to FIGS. 1, 5, and 6.

At 704, executing a local deep learning model on the network traffic is performed. For example, the local deep learning model can include an MLC2 model (e.g., and/or other LDL model) that is executed on the security platform, such as similarly described above with respect to FIGS. 5 and 6.

At 706, performing an action in response to determining that the monitored session is associated with malware based at least in part on a verdict from the deep learning model.

FIG. 8 is another flow diagram for providing deep learning for inline detection of malicious C2 traffic from unstructured payloads in accordance with some embodiments. In some embodiments, a process as shown in FIG. 8 is performed by a security platform (e.g., a data appliance 102 using a malware analysis system 112, such as an inline deep learning model and/or other components), and techniques as similarly described above including the embodiments described above with respect to FIGS. 1-6.

At 802, periodically checking for a local deep learning model update from a model cloud entity is performed, such as similarly described above with respect to FIGS. 4 and 5.

At 804, downloading an updated (or new) local deep learning model from the model cloud entity is performed, such as similarly described above with respect to FIGS. 4, 5, and 6. For example, the updated (or new) local deep learning model can include an MLC2 model (e.g., and/or other LDL model) that can be automatically trained, such as similarly described above with respect to FIGS. 4-6.

At 806, deploying the updated (or new) local deep learning model on a security platform is performed, such as similarly described above with respect to FIGS. 4 and 5.

At 808, applying the updated (or new) local deep learning model on a session at the security platform is performed, such as similarly described above with respect to FIGS. 4-6.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
    monitor a session at a security platform, wherein the session includes network traffic;
    execute a local deep learning model on the network traffic, wherein the local deep learning model is a machine learning implemented command and control (MLC2) model executed on the security platform;
    perform an action in response to determining that the monitored session is associated with malware based at least in part on a verdict from the deep learning model; and
    update the local deep learning model using new training data, wherein the new training data includes User Datagram Protocol (UDP) traffic, wherein a payload of a UDP packet of the UDP traffic includes a reputation of source and destination IP addresses of the UDP packet, wherein the updating of the local deep learning model comprises to:
        input the new training data into the local deep learning model;
        perform byte-level and/or word-level tokenization and embedding of the UDP traffic; and
        generate the updated local deep learning model based on the byte-level and/or the word-level tokenization and embedding; and
    a memory coupled to the processor and configured to provide the processor with instructions.

2. The system of claim 1, wherein the MLC2 model automatically detects command and control (C2) traffic.

3. The system of claim 1, wherein the MLC2 model is generated as a convolutional neural network (CNN) implemented model.

4. The system of claim 1, wherein the action includes dropping the network traffic, blocking the network traffic, generating an alert, logging the network traffic, quarantining an endpoint associated with the network traffic, and/or sending the network traffic to a security cloud entity for further analysis.

5. The system of claim 1, wherein the processor is further configured to:
    perform prefiltering at the security platform on the network traffic to determine whether to apply the local deep learning model.

6. The system of claim 1, wherein the processor is further configured to:
    input a byte stream associated with the network traffic into the local deep learning model.

7. The system of claim 1, wherein the processor is further configured to:
    input a byte stream associated with the network traffic into the local deep learning model; and
    perform tokenization processing of the byte stream provided as input into the local deep learning model.

8. The system of claim 1, wherein the processor is further configured to:

input a byte stream associated with the network traffic into the local deep learning model; and
perform tokenization processing of the byte stream provided as input into the local deep learning model, wherein one or more bytes are extracted from the byte stream and translated into one or more tokens.

9. The system of claim 1, wherein the processor is further configured to:
    input a byte stream associated with the network traffic into the local deep learning model;
    perform tokenization processing of the byte stream provided as input into the local deep learning model, wherein one or more bytes are extracted from the byte stream and translated into one or more tokens; and
    generate a score using the local deep learning model that processes the one or more tokens.

10. A method, comprising:
monitoring a session at a security platform, wherein the session includes network traffic;
executing a local deep learning model on the network traffic, wherein the local deep learning model is a machine learning implemented command and control (MLC2) model executed on the security platform;
performing an action in response to determining that the monitored session is associated with malware based at least in part on a verdict from the deep learning model; and
updating the local deep learning model using new training data, wherein the new training data includes User Datagram Protocol (UDP) traffic, wherein a payload of a UDP packet of the UDP traffic includes a reputation of source and destination IP addresses of the UDP packet, wherein the updating of the local deep learning model comprises:
    inputting the new training data into the local deep learning model;
    performing byte-level and/or word-level tokenization and embedding of the UDP traffic; and
    generating the updated local deep learning model based on the byte-level and/or the word-level tokenization and embedding.

11. The method of claim 10, wherein the MLC2 model automatically detects command and control (C2) traffic.

12. The method of claim 10, wherein the MLC2 model is generated as a convolutional neural network (CNN) implemented model.

13. The method of claim 10, wherein the MLC2 model is generated as a convolutional neural network (CNN) implemented model that is trained using byte-level and/or word-level tokenization.

14. The method of claim 10, wherein the action includes dropping the network traffic, blocking the network traffic, generating an alert, logging the network traffic, quarantining an endpoint associated with the network traffic, and/or sending the network traffic to a security cloud entity for further analysis.

15. A computer program product embodied in a non-transitory computer readable medium and comprising computer instructions for:
    monitoring a session at a security platform, wherein the session includes network traffic;
    executing a local deep learning model on the network traffic, wherein the local deep learning model is a machine learning implemented command and control (MLC2) model executed on the security platform;

performing an action in response to determining that the monitored session is associated with malware based at least in part on a verdict from the deep learning model; and updating the local deep learning model using new training data, wherein the new training data includes User Datagram Protocol (UDP) traffic, wherein a payload of a UDP packet of the UDP traffic includes a reputation of source and destination IP addresses of the UDP packet, wherein the updating of the local deep learning model comprises:

inputting the new training data into the local deep learning model;

performing byte-level and/or word-level tokenization and embedding of the UDP traffic; and generating the updated local deep learning model based on the byte-level and/or the word-level tokenization and embedding.

* * * * *